3,720,340
BOTTLE CONSTRUCTED OF A BLEND OF POLYMERS FROM METHACRYLONITRILE, MONOVINYLIDENE AND RUBBER COMPOUNDS
Yoon Chai Lee and Quirino A. Trementozzi, Springfield, Mass., assignors to Monsanto Company, St. Louis, Mo.
No Drawing. Continuation-in-part of application Ser. No. 776,250, Nov. 15, 1968, now Patent No. 3,615,710. This application Feb. 11, 1971, Ser. No. 114,690
The portion of the term of the patent subsequent to June 24, 1986, has been disclaimed
Int. Cl. B32b 27/30, 27/32; B65d 23/00
U.S. Cl. 215—1 C                  15 Claims

ABSTRACT OF THE DISCLOSURE

Disclosed herein are packaging materials having oxygen permeability of no more than 3.0 cc./100 sq. in./24 hr./ atoms/mil at 73° F. and water permeability of no more than 3.0 gms./24 hr./100 sq. in./mil at 73° F. The materials are based upon interpolymers of methacrylonitrile with at least one monovinylidene aromatic compound wherein the methacrylonitrile constitutes 70–98% by weight of the interpolymer.

CROSS-REFERENCE TO RELATED APPLICATION

This is a continuation-in-part of co-pending U.S. application Ser. No. 776,250, filed Nov. 15, 1968 now U.S. Pat. 3,615,710.

BACKGROUND OF THE INVENTION

(1) Field of the invention

This invention relates to novel packaging materials. More particularly, it relates to an improved method for protecting foods, medicines and other related substances by packaging them in materials based upon interpolymers of methacrylonitrile with monovinylidene aromatic compounds, said packaging materials having improved resistance to oxygen permeability and water permeability, improved color, and further exhibiting excellent processing properties.

(2) Description of the prior art

The currently available synthetic polymers which are used in the preparation of packaging materials for food stuffs, medicines, and related substances are characterized by one or more serious deficiencies which detract from their packaging utility. Most synthetic polymers with good thermoforming or processing characteristics have a high rate of oxygen permeability and water transmission so that foods and medicines packaged in these materials suffer water gain or loss, oxidation, discoloration, loss of taste, aroma, etc., thereby losing their customer appeal. Vinylidene copolymers have sufficient oxygen impermeability to permit their use in some food packaging applications. However, the use of these materials has been largely confined to film applications because of the processing difficulties encountered in forming thick walled objects. These vinylidene copolymers have poor heat seal characteristics, poor draw properties, low heat distortion temperatures and thermoforming stability, low modulus and low strength which seriously limits their widespread use. Other polymer systems such as fully hydrolyzed polyvinyl alcohol have very high resistance to oxygen permeability but these systems have serious deficiencies in that they are water sensitive and have a very high water transmission rate. These polyvinyl alcohol polymers fail to retain their excellent resistance to oxygen permeability at conditions of high humidity and further, have poor processing characteristics in general.

A definite need exists for a new class of packaging materials which has a high resistance to oxygen permeability and low water permeability as well as improved processing and physical properties to allow fabrication in diverse shapes and sizes, e.g., bottles, containers, sheets, thin films, etc.

This need was fulfilled, at least in part, and disclosed in co-pending application S.N. 642,207, filed May 29, 1967 now U.S. 3,451,538 and S.N. 648,223, filed June 23, 1967 now U.S. 3,540,577. Ser. No. 642,207 disclosed packages prepared from copolymers containing 55–90 weight percent acrylonitrile. These packages exhibited excellent permeability properties, but, under some processing conditions, tended to develop a dark yellow to brownish-red color, thereby limiting the processes by which they could be produced. It was then discovered, and disclosed in Ser. No. 648,223 that the color could be improved and the range of permissible processing conditions broadened by the use of copolymers of methacrylonitrile with alpha-olefins, particularly isobutylene, wherein the methacrylonitrile was present in a range of 55 to 98% by weight. Even with this improvement, however, it was found that there was still a need for a packaging material which would exhibit the above-described excellent permeability properties, which would have a very low degree of color and which could be processed, e.g., extruded or molded, with a greater degree of facility.

SUMMARY OF THE INVENTION

The required degree of oxygen permeability and water vapor permeability in a packaging material will vary with the particular food or medicine to be packaged and the storage conditions, e.g., temperature, humidity, ventilation, light-type and intensity, etc. In general, a critical application will require a material with an oxygen permeability of no more than 3.0 cc./100 sq. in./24 hr./atmos./ mil at 73° F. and a water permeability of no more than 3.0 gms./24 hr./100 sq. in./mil at 73° F.

This criticality is illustrated in Modern Packaging, March 1965, "Flexible-Vacuum Performance," p. 201 following, wherein the extreme sensitivity of coffee to moisture and oxygen is discussed. The authors of this article state that an increase in the moisture content of coffee of about 1%, i.e., from 1.4 to 2.6% will cause a stale odor after 20 days, while only 14 cc. of oxygen will cause staling in one pound of coffee.

Dairy foods, meat products and some medicines show as much, if not greater, oxygen and moisture sensitivity as coffee and, in some instances, require packaging materials with even greater impermeability to oxygen and water than that required for coffee packaging.

This invention is directed toward furnishing a packaging material of excellent color and clarity designed to meet these more critical packaging requirements.

It is, therefore, an object of this invention to provide a novel packaging material for foods, medicines, and related objects, wherein the packaging materials exhibit a high resistance to oxygen permeability and low water vapor transmission rate as well as improved processing and physical properties.

It is a further object of this invention to provide a novel package for foods, medicines and related substances which exhibits high resistance to oxygen permeability and a low water transmission rate as well as excellent color and clarity.

DESCRIPTION OF THE PREFERRED EMBODIMENTS

The above and other objects are obtained by providing packaging materials for foods, medicines and other related substances wherein the packaging materials exhibit oxygen permeability of no more than 3.0 cc./100 sq. in./24 hr./atmos./mil at 73° F. and water permeability of no more than 3.0 gms./24 hr./100 sq. in./mil at 73° F. and based upon an interpolymerization product comprising methacrylonitrile and at least one monovinylidene aromatic compound wherein the methacrylonitrile moiety constitutes from about 70 to about 98% of the final polymerization product.

The component responsible for the improved barrier properties and improved color and clarity described in this invention is the methacrylonitrile component which must be present in an amount of at least 70 weight percent of the total resin weight. This is necessary in order to obtain the low water and oxygen permeabilities referred to above. These levels of permeance are maximum limits tolerable for use in areas requiring critical barrier properties if product degradation, oxidation or loss of taste and/or aroma is to be avoided. Even within this area, certain products require packaging materials with correspondingly lower permeabilities than others.

The weight percent range of methacrylonitrile used in the copolymers of this invention is from 70 to 98% with 78–98 weight percent preferred.

More particularly the packages of this invention are prepared from:

(A) The product of the copolymerization of methacrylonitrile and at least one monovinyidene aromatic compound wherein the methacrylonitrile comprises from about 70 to about 98 weight percent of the copolymer; or (B) The product of the graft polymerization onto a rubber of a monomer mixture of methacrylonitrile and at least one monovinylidene aromatic hydrocarbon wherein the methacrylonitrile constitutes 70–98 percent by weight of the final polymerization product; or (C) A blend of (1) a copolymerization product of methacrylonitrile and at least one monovinylidene aromatic compound and (2) a product of the graft polymerization onto a rubber of a monomer mixture of methacrylonitrile and at least one monovinylidene aromatic compound, wherein the methacrylonitrile content of the blend is about 70–98% by weight.

The lower limit of 70 weight percent methacrylonitrile is essential if the packaging material is to be used in the critical packaging applications discussed above. The upper limit of 98% is critical in order to maintain the low water permeablity and to provide a material that is readily processable into bottles, containers, sheets and films and exhibits high clarity, transparency and absence of color. A homopolymer of methacrylonitrile assumes a dark red color upon processing, probably due to the degradation. This dark red color is unacceptable for materials to be used in packaging since it does not provide the consumer with a true view of the contents of the package. It is believed that the degradation of polymethacrylonitrile is due to the necessity for high heating upon processing so that a melt can be achieved. It is also believed that the presence of the comonomer in the methacrylonitrile copolymers of this invention prevents long sequences of methacrylonitrile placement yielding a copolymer having a lower melting temperature range and improved flow behavior at relatively low temperatures thereby precluding the use of temperatures high enough to cause degradation.

As a result, the copolymers not only exhibit good barrier characteristics but also have the critical properties which allow them to be shaped readily into films and bulky objects which meet the critical packaging requirements of the applications contemplated herein.

The monovinylidene aromatic hydrocarbons are of the general formula:

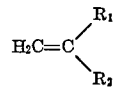

wherein $R_1$ is hydrogen, chlorine or methyl and $R_2$ is an aromatic radical of 6 to 10 carbon atoms which may also contain substitutents such as halogen and alkyl groups attached to the aromatic nucleus, e.g. styrene, alpha methyl styrene, vinyl toluene, alpha chlorostyrene, ortho chlorostyrene, meta chlorostyrene, para chlorostyrene, ortho methyl styrene, para methyl styrene, ethyl styrene, isopropyl styrene, dichloro styrene, vinyl naphthalene, etc. Styrene is the preferred comonomer.

This invention also contemplates the use of a synthetic or natural rubber component such as polybutadiene, isoprene, neoprene, nitrile rubbers, natural rubbers, acrylonitrile-butadiene copolymers, ethylene-propylene copolymers, chlorinated rubbers, etc., which is used to strengthen or toughen the packaging materials prepared from this invention. This rubbery component may be incorporated into the methacrylonitrile-containing polymer by any of the methods which are well known to those skilled in the art, e.g., direct polymerization of monomers, polyblends, grafting the methacrylonitrile monomer mixture onto the rubbery backbone, physical admixtures of the rubbery component, etc. Especially preferred are polyblends derived by mixing a graft copolymer of methacrylonitrile and styrene on the rubbery backbone with another copolymer of methacrylonitrile and styrene.

The methacrylonitrile copolymers of this invention may be prepared according to any method well known to those skilled in the art, e.g., by bulk, emulsion, solution, or suspension polymerization methods. They may be prepared at atmospheric, sub-atmospheric or super-atmospheric pressures.

The packaging films prepared from the foregoing polymers may be made by extrusion, pressing, calendering, casting and by other means well known to those skilled in the art. Bottles and containers may be made by any of the conventional methods such as blow extrusion, injection molding, vacuum forming, casting, etc. Where the materials of this invention are subjected to uniaxial or biaxial orientation, still further improvements in the water vapor permeability are noted. When the materials are so oriented, it is preferred that they be stretched at least about 300% in one or both directions. It is further preferred that the stretching be carried out at a rate of at least about 2000% per minute. The preferred rate of stretching ranges 10,000–20,000% per minute.

Biaxial stretching can be effected in a single or continuous operation. In piece operation, a lazy-tongs-type cross-stretcher can be used to advantage, whereas in continuous-type operations either tenter-type cross-stretching frames or blow-extrusion techniques can be used. When tenter-frames are used, the differential in speed between the front and rear rollers develops longitudinal stretching, while simultaneously the lateral spacing of the frame develops transversal stretching to provide simultaneously biaxially stretch-oriented film.

This invention also contemplates the use of conventional additives such as dyes, fillers, pigments, plasticizers, stabilizers, processing aids, etc., in the packaging materials of this invention.

The following examples are given in illustration of the invention and are not to be construed as limitations thereof. All parts and percentages are by weight unless otherwise indicated.

EXAMPLE 1

Part A

To a 5-liter four-necked flask equipped with an agitator add 200 grams of water and 4 grams of lauryl alcohol sulfate. Heat to 75° C. and purge with nitrogen for ½ hour. Add 0.33 gram of a 4% aqueous solution of potassium persulfate and 0.1 gram of terpinolene. In a separate flask mix 90 grams of methacrylonitrile and 10 grams of styrene and purge the mixture with nitrogen. Then add the monomer mixture to the first flask dropwise over a period of 9 hours. Another 0.33 gram of the potassium persulfate is added after 4 hours monomer addition time and a further 0.33 gram is added after 8 hours. Test the conversion level after all the monomer has been added and when it has reached 98%, cool the reaction. Coagulate the resin and then thoroughly wash with water. Follow this with a methanol wash and then another water wash.

Part B

When dry, extrude the resin prepared in Part A from a 1½" extruder having a barrel temperature of 340° F. in the front portion, 350° F. in the middle portion and 350° F. in the rear portion and a die temperature of 300°. Compression mold the extrudate into pin hole-free sheets 5–7 mils thick.

Part C

A sample of the film prepared in Part B is placed in a Dow Cell, manufactured by Custom Scientific Instruments, Inc., Kearney, N.J. The cell is evacuated on both sides until an equilibrium is reached. Then oxygen at one atmosphere pressure is introduced on one side of the sample and brought to equilibrium. The pressure increase on the opposite side of the chamber, caused by the oxygen permeation, is recorded. The permeability is expressed in cc.'s/24 hrs./100 sq. in./mil at 1 atmos. The general procedures and theory are outlined in ASTM procedure D–1434. For the sample prepared in Parts A and B above the oxygen permeability is found to be 0.4 at 73° F.

Part D

The water permeability is measured by placing the sample of the material prepared in Parts A and B above in a cell wherein one side of the film is in direct contact with water and the other side is exposed to an environment at 50% relative humidity. There is a pressure differential of 10.5 mm. Hg between the two portions of the chamber and tests are conducted at 70° F. The water permeability for this sample is found to be 0.8.

EXAMPLES 2–6

Copolymers of 70/30 (Example 2), 75/25 (Example 3), 80/20 (Example 4), 85/15 (Example 5), 95/5 (Example 6), methacrylonitrile/styrene are prepared as in Example 1, Parts A and B, and are tested for water permeability and oxygen permeability as in Example 1, Parts C and D. The results are shown in Table 1.

TABLE 1.—BARRIER PROPERTIES OF METHACRYLONITRILE/STYRENE COPOLYMERS

| Example | Weight percent nitrile component | Water permeability at 73° F. | Oxygen permeability at 73° F |
|---|---|---|---|
| 2 | 70 | 2.0 | 3.0 |
| 3 | 75 | 1.6 | 1.8 |
| 4 | 80 | 1.3 | 1.1 |
| 5 | 85 | 1.1 | 0.65 |
| 6 | 95 | 0.7 | 0.23 |

EXAMPLE 7

This example illustrates the preparation of bottles to be used in the packaging of food, medicines and related substances.

Four ounce (4 oz.) Boston Round bottles are prepared using the same polymers as those used to prepare the films in the preceding examples. The bottles are prepared using a blow extruder to give bottles with an average wall thickness of 20 mils. Gas chromatograph tests indicate that these bottles have oxygen barrier properties equal to their film counterparts.

EXAMPLE 8

In to a reactor equipped with an agitator is charged 42.1 parts of water, 5.9 parts of a 93/7 butadiene/acrylonitrile rubber latex containing 42% rubber solids, 1 part lauryl alcohol sulfate and 2.09 parts of 4.3% by weight aqueous solution of potassium persulfate. In a separate vessel is mixed 24.3 parts of methacrylonitrile and 2.7 parts of styrene.

The agitator is operated at 100 r.p.m. and the batch temperature is increased to, and maintained at, 75° C.

The monomer addition is carried out over a period of nine hours. A second 2.09 parts of potassium persulfate is added after four hours and a third after six hours.

After all the monomer has been added the batch is held at 75° C. for an additional three hours and then cooled yielding a latex containing 96.9% solids. Resin recovery and washing are carried out as in Example 1, Part A and films are prepared and tested as in Example 1, Parts B, C and D. The oxygen permeability is found to be 0.61 cc./24 hrs./100 in.$^2$/mil/atmos. at 73° F. and the water permeability is 1.37 gm./24 hrs./100 in.$^2$/mil at 73° F.

EXAMPLE 9

The copolymer emulsion of Example 1 is added to the interpolymer of Example 9 to an extent sufficient to lower the rubber content of the blend to 10%. Sample work-up is as described above and permeability properties are found to be equivalent to those of Examples 1 and 8.

It will be obvious that many other variations may be made in the products and processes of this invention without departing from the scope thereof.

We claim:

1. A molded container having an oxygen permeability of no more than 3.0 cc./100 sq. in./24 hrs./atmos./mil at 73° F. and a water permeability of no more than 3.0 gms./24 hrs./100 sq. in./mil at 73° F. constructed of materials which comprise an interpolymer comprising methacrylonitrile and at least one monovinylidene aromatic compound; wherein the methacrylonitrile moiety constitutes from about 70 to about 98 percent by weight of the final interpolymer; said container having been formed by molding the molten interpolymer in an essentially solvent-free condition or by forming a sheet produced from the molten interpolymer in an essentially solvent-free condition.

2. The molded container of claim 1 wherein the methacrylonitrile moiety constitutes from 78 to 98 percent by weight of the final interpolymer.

3. The molded container of claim 1 wherein the interpolymeric materials of which the molded container is constructed are biaxially oriented.

4. The molded container of claim 1 wherein the interpolymer comprises methacrylonitrile, styrene and at least one monovinylidene aromatic compound other than styrene.

5. The molded container of claim 1 wherein the interpolymer consists essentially of methacrylonitrile and styrene.

6. The molded container of claim 5 wherein the interpolymeric materials of which the container is constructed are biaxially oriented.

7. The molded container of claim 1 wherein said molded container is a bottle.

8. The molded container of claim 5 wherein said molded container is a bottle.

9. The molded container of claim 6 wherein said molded container is a bottle.

10. A package having an oxygen permeability of no more than 3.0 cc./100 in.$^2$/24 hrs./atmos./mil at 73° F. and a water permeability of no more than 3.0 gms./24 hrs./100 in.$^2$/mil at 73° F. constructed of materials which consist essentially of the product of the graft polymerization onto a rubber of methacrylonitrile and at least one monovinylidene aromatic compound; wherein the methacrylonitrile moiety constitutes from about 70 to about 98 percent by weight of the final graft interpolymer.

11. The package of claim 10 wherein the methacrylonitrile moiety constitutes from 78 to 98 percent by weight of the final graft interpolymer.

12. The package of claim 10 wherein the monovinylidene aromatic compound is styrene.

13. The package of claim 10 wherein the graft interpolymeric materials of which the package is constructed are biaxially oriented.

14. A package having an oxygen permeability of no more than 3.0 cc./100 sq. in./24 hrs./atmos./mil at 73° F. and a water permeability of no more than 3.0 gms./24 hrs./100 sq. in./mil at 73° F. constructed of materials which consist essentially of a blend of:
  (A) a polymerization product comprising methacrylonitrile and at least one monovinylidene aromatic compound; and
  (B) a product of the graft polymerization onto a rubber of methacrylonitrile and at least one monovinylidene aromatic compound;
wherein the methacrylonitrile moiety constitutes from about 70 to about 98 percent by weight of the final polymeric blend.

15. The package of claim 14 wherein the materials of which the package is constructed are biaxially oriented.

References Cited

UNITED STATES PATENTS

| | | | |
|---|---|---|---|
| 3,615,710 | 10/1971 | Lee et al. | 99—171 LP |
| 3,293,047 | 12/1966 | Pfister | 99—171 LP |
| 3,451,538 | 6/1969 | Trementozzi | 260—876 R |
| 3,524,536 | 8/1970 | Terenzi et al. | 99—171 LP |
| 3,600,465 | 8/1971 | Knapp et al. | 260—880 R |
| 3,438,971 | 4/1969 | Walker | 260—893 X |

ROBERT F. BURNETT, Primary Examiner

C. B. COSBY, Assistant Examiner

U.S. Cl. X.R.

99—171 LP, 181 R; 161—247, 255, 256; 229—3.5 R; 260—4 AR, 85.5, 876, 880